May 4, 1965 R. DEWAS 3,181,568
DEVICE FOR THE FORMATION OF SELVEDGES ON LOOMS
Filed Feb. 23, 1962 7 Sheets-Sheet 1
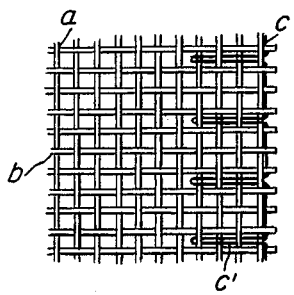
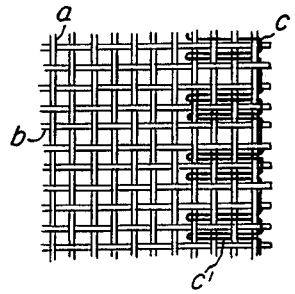
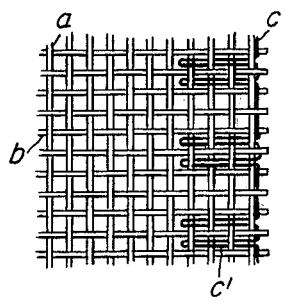
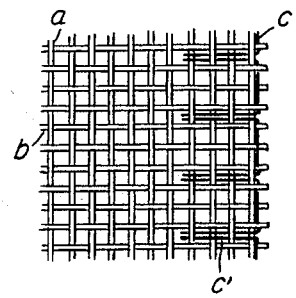
INVENTOR
Raymond Dewas
BY Richards & Geier
ATTORNEYS

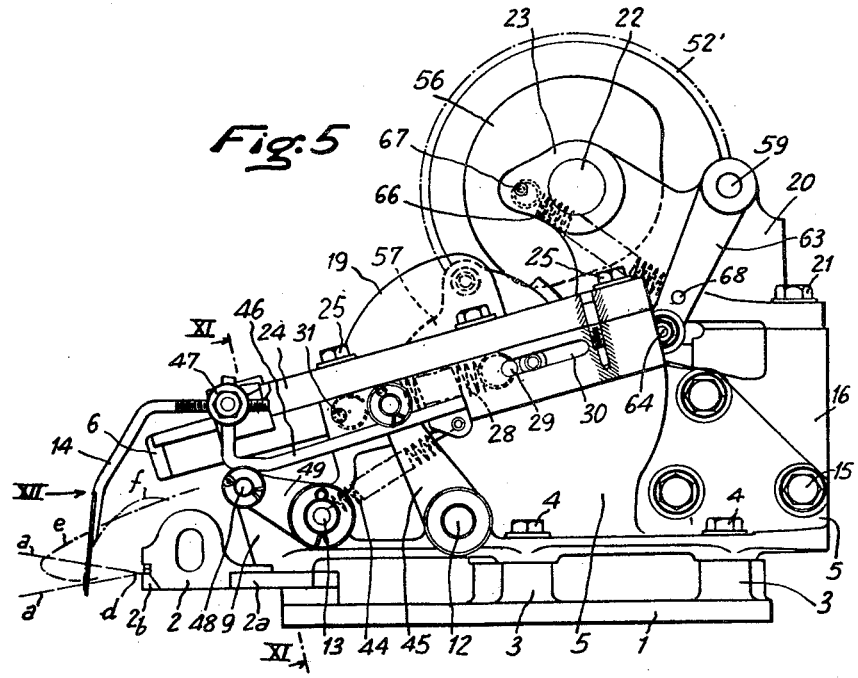
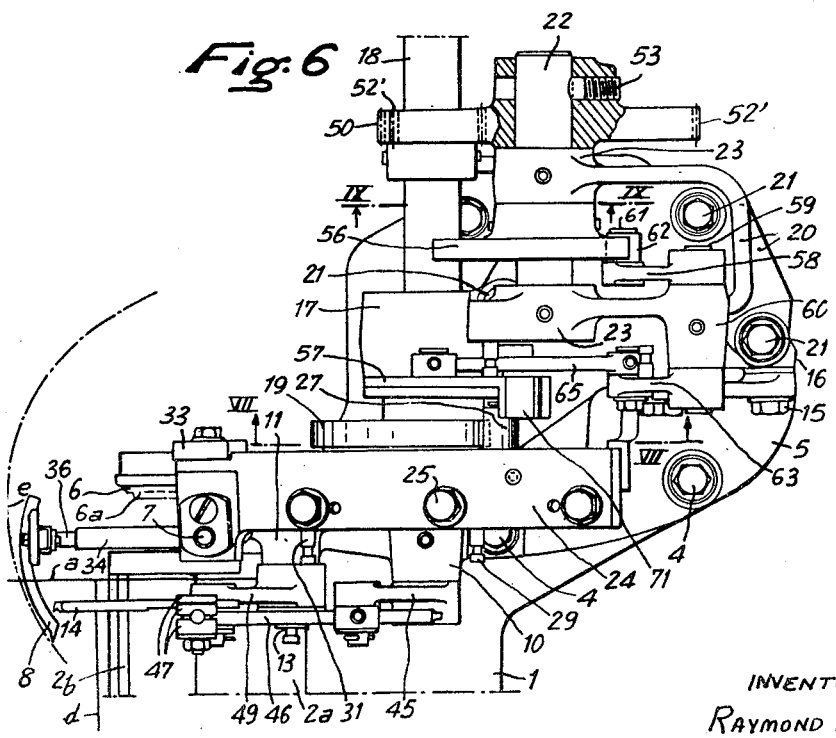

May 4, 1965   R. DEWAS   3,181,568
DEVICE FOR THE FORMATION OF SELVEDGES ON LOOMS
Filed Feb. 23, 1962   7 Sheets-Sheet 3
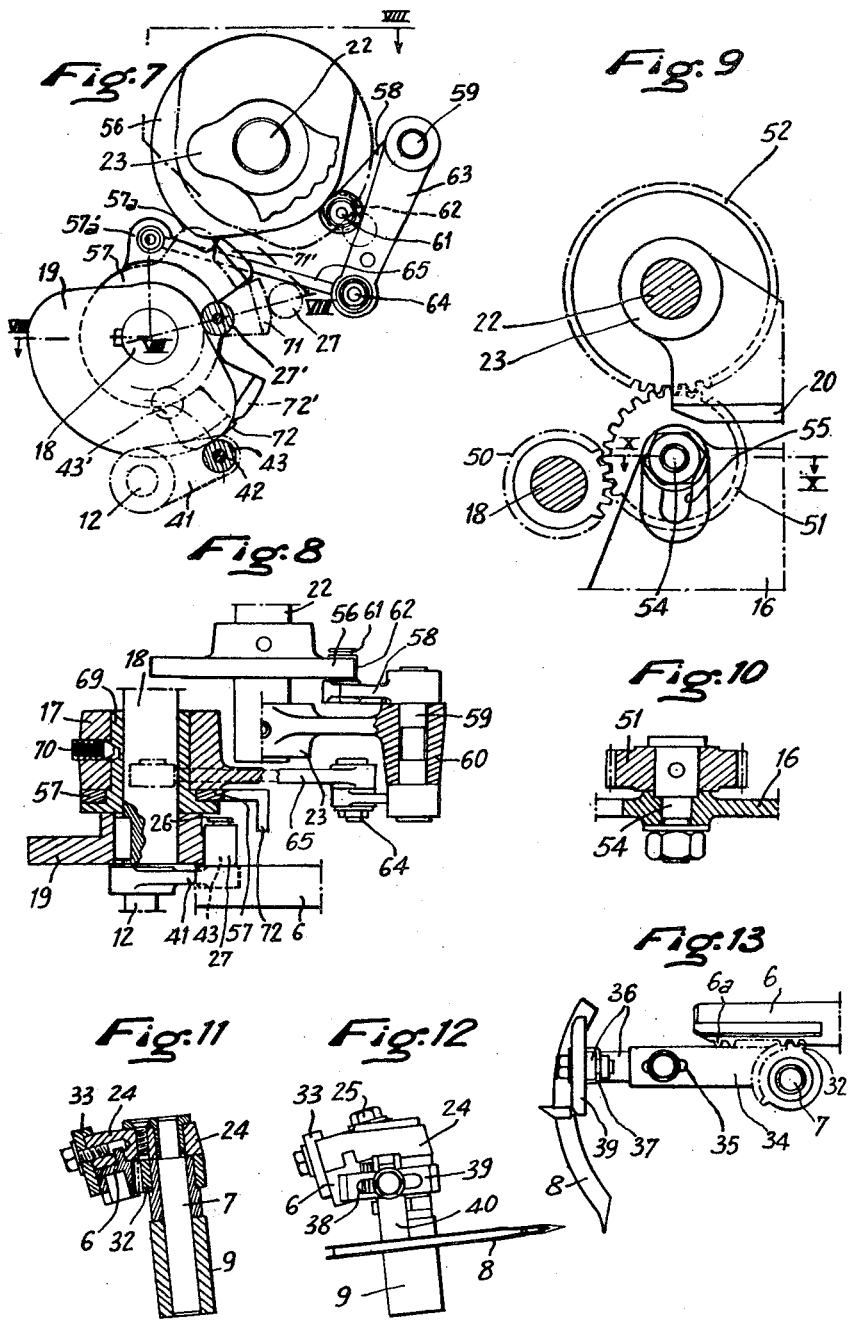
INVENTOR.
RAYMOND DEWAS
By Richards & Geier
ATTORNEYS May 4, 1965 R. DEWAS 3,181,568
DEVICE FOR THE FORMATION OF SELVEDGES ON LOOMS
Filed Feb. 23, 1962 7 Sheets-Sheet 4

INVENTOR.
RAYMOND DEWAS
By Richards & Geier
ATTORNEYS

May 4, 1965 R. DEWAS 3,181,568
DEVICE FOR THE FORMATION OF SELVEDGES ON LOOMS
Filed Feb. 23, 1962 7 Sheets-Sheet 5
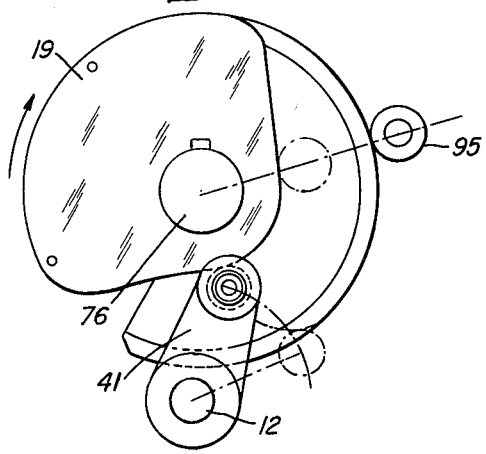
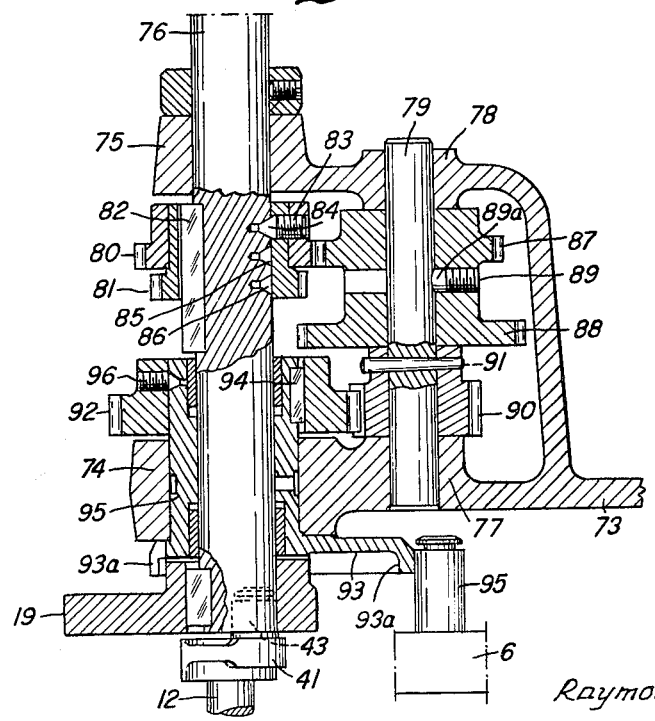
INVENTOR
Raymond Dewas
BY Richards & Geier
ATTORNEYS INVENTOR
Raymond Dewas May 4, 1965 R. DEWAS 3,181,568
DEVICE FOR THE FORMATION OF SELVEDGES ON LOOMS
Filed Feb. 23, 1962 7 Sheets-Sheet 7

INVENTOR
Raymond Dewas
BY Richards & Geier
ATTORNEYS

United States Patent Office 3,181,568
Patented May 4, 1965

3,181,568
DEVICE FOR THE FORMATION OF SELVEDGES ON LOOMS
Raymond Dewas, 120 Blvd. Saint Quentin, Amiens, Somme, France
Filed Feb. 23, 1962, Ser. No. 175,145
Claims priority, application France, Feb. 24, 1961, 853,749; Oct. 17, 1961, 876,148; Feb. 13, 1962, 887,841
11 Claims. (Cl. 139—122)

The present invention relates to looms which are either straight, circular or otherwise, having shuttles or continuous weft feed, of any type whatsoever.

The invention is directed to the formation of selvedges on fabrics, the edges of which are unfinished (as well as the formation of centre or inside selvedges), by means of a separate thread which is inserted in the selvedge (or in each selvedge) in the shape of loops or hair-pins, the length of which pre-determines the width of the selvedge.

The insertion of this separate thread is carried out by a device which comprises an arcuate needle or like member and a plunger which retains the said thread especially as has been described and illustrated in the U.S. patent applications of the present applicant, Serial Nos. 717,389 and 817,226.

The present invention has for its object to provide a means for inserting the said loops either after every pick or after every two or more picks.

The device in accordance with the invention is characterized in that the main shaft on which are mounted the cam or cams controlling the movements of the needle or like member and of the plunger is continuously driven through a transmission system providing an appropriate gear ratio and a countershaft which operates in combination with means for placing periodically in an inoperative position the members which actuate the needle and the plunger which work in combination with the said cam or cams.

In accordance with a first form of embodiment, the countershaft which rotates continuously at a speed equal to a fraction of the speed of the main shaft carries an intermittent-action cam which controls the position of members having the function of neutralizing periodically the member which actuate the needle and the plunger.

In accordance with one form of construction, the intermittent-action cam operates a disc which is mounted to rotate freely on the main shaft and which is provided at the periphery thereof with protuberances or heels which periodically come into position beneath the rollers designed to operate the arcuate needle or like member and the plunger respectively, in such manner as to hold the said rollers at a distance away from the profile of the corresponding cam or cams.

In accordance with a second form of embodiment, the countershaft actuates a rotary intermittent-action disc which is mounted co-axially with, and in proximity to, the cam which operates the needle and the plunger.

In accordance with the first form of construction, the intermittent-action disc which is mounted to rotate freely on the main shaft has the shape of a circle sector so arranged and of such dimensions that, the roller of the arcuate needle being of appropriate length to permit of its co-operation with the said sector, and said roller is periodically prevented from following the law of movement of the cam as a result of the action of the said sector. The roller which controls the movement of the plunger has a length such that it comes into contact only with the cam; however, the said plunger could also be held at a distance away from the cam during the periods of non-insertion of the separate thread, but for reasons of mechanical simplification, it has been found preferable in this form of construction to allow the said plunger to operate at each pick and it obviously follows that the plunger then retains the separate thread for the purpose of forming the loop only when this latter has been presented by the arcuate needle at the frequency which has been chosen.

In accordance with this same form of construction, it is possible to effect an insertion of the separate thread either every two revolutions of the loom or every three revolutions by means of the simple displacement of a gear and by means of an easy adjustment of the angular position of the intermittent-action disc with respect to the cam.

In accordance with the second form of construction, the intermittent-action disc is formed by a complete circle instead of a circle sector. The said disc is fitted at the periphery thereof with detachable flanges which are secured in position by mean of screws and which are placed in the position required in order to effect the insertion of loops at the desired frequency.

In order that the invention may be more clearly understood, there follows below a description of forms of practical application which are given solely by way of example and not in any sense by way of implied limitation and which are diagrammatically illustrated in the accompanying drawings, in which:

FIGURES 1 to 4 are plan views of four fabrics and four selvedge formations.

FIG. 5 is a view in elevation of the side of the device for the formation of a selvedge in accordance with the first form of embodiment of the invention.

FIG. 6 is a plan view of FIG. 5 as seen from above, a portion of the device being broken away.

FIG. 7 is a sectional view taken along lines VII—VII of FIGURE 6.

FIG. 8 is a sectional plan view along the line VIII—VIII—VIII of FIG. 7.

FIG. 9 is a side view taken along the line IX—IX of FIG. 6 showing the operation of the countershaft or secondary shaft.

FIG. 10 is a partial section along the line X—X of FIG. 9.

FIG. 11 is a view in section taken along the line XI—XI of FIG. 5.

FIG. 12 shows in elevation the arcuate needle and its assembly as seen by looking from the position XII indicated in FIG. 5.

FIGURE 13 is a plan view of the same needle essembly as seen from above in FIGURE 5 with the cover plate removed.

FIGURE 16 is a detailed sectional view taken on line XVI—XVI of FIGURE 15 and showing the intermittent-action disc as well as the cam which is keyed on the main shaft and which actuates the arcuate needle and the plunger.

FIGURE 17 is a sectional view taken along a cutting plane passing through the axes of shafts 76 and 79 of FIGURE 15, the shafts being shown in full view.

Figure 14:
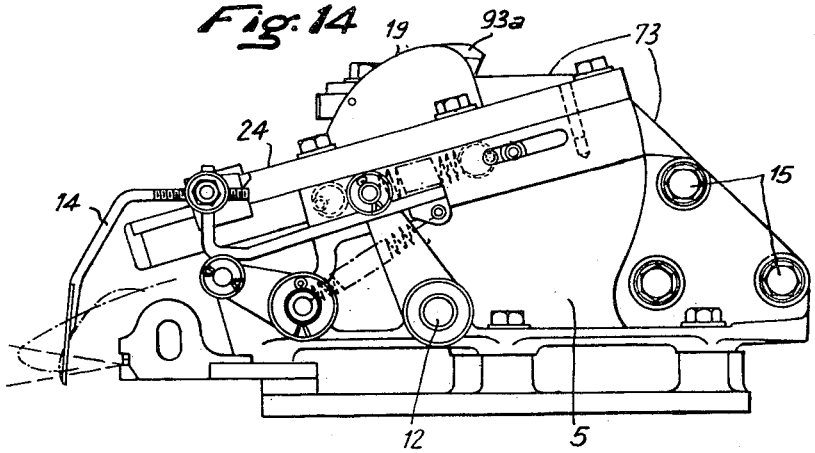
FIG. 14 is a view in side elevation of the device for the formation of a selvedge in accordance with the second form of embodiment of the invention.
Figure 15:
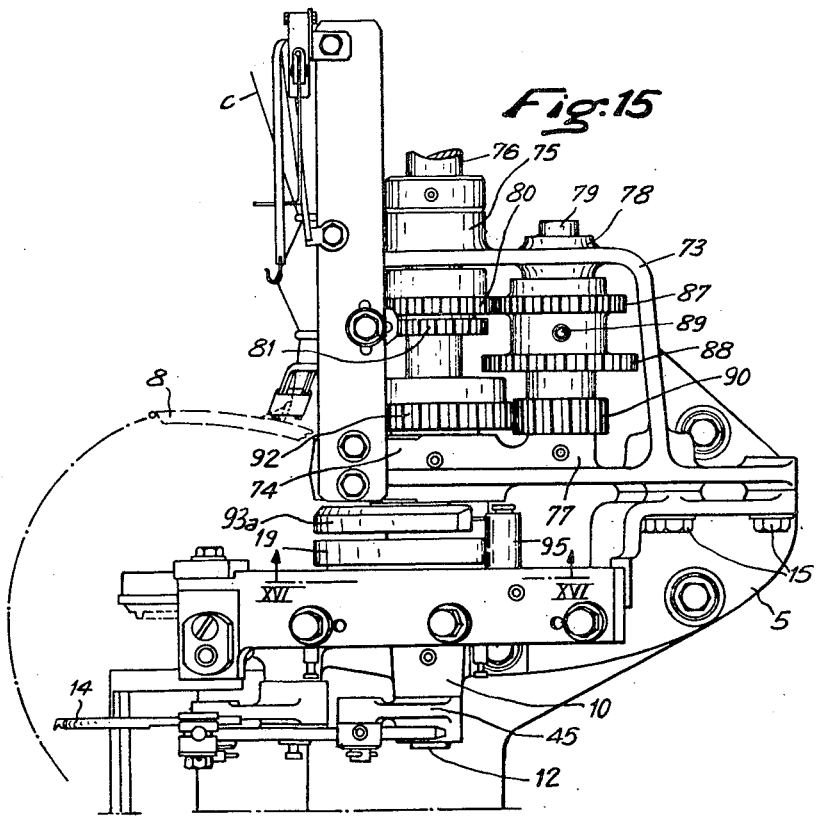
FIG. 15 is a plan view of FIGURE 14 looking from above.

In the pieces of fabrics shown in FIGS. 1 to 3, the selvedge is formed by loops $c'$ of an auxiliary thread $c$ inserted between marginal warp threads $a$, each loop extending beside a weft thread $b$, the arrangement, however, being different in the three samples.

In the sample of FIG. 1, one loop of auxiliary thread is inserted every other three weft threads, in the sample of FIG. 2, two loops of auxiliary thread are inserted every other three weft threads, while in the sample of FIG. 3, two loops of auxiliary thread are inserted every other four weft threads.

In the modification shown in FIG. 4, one loop $c'$ of auxiliary thread $c$ is inserted every other three weft threads $b$ as shown in FIG. 4, and furthermore it is cut off at its apex thus forming hairpin-like elements of auxiliary thread between two successive loops.

There now follows a description relating to the mechanism which is illustrated in FIGS. 5 to 13.

The combined assembly of the said mechanism is mounted on a base-plate 1 (FIGS. 5 and 6) which is rigidly fixed to the rear portion 2a of the temple 2 provided with front cross-strip 2b, the cylinder of the temple having been omitted from the drawings for the purpose of clarity. The base plate is also connected with the breast-beam at the front portion of the loom frame. The base-plate 1 is provided with bosses 3 on which is fixed, by means of screws 4 the base of a frame 5 which supports among other parts a rack-bar 6 and the spindle 7 (FIGS. 11–13) of the arcuate needle 8 by means of the bearing 9. The frame 5 also supports the pins 12 and 13 of the link-rod system of the plunger 14 by means of the bearings 10 and 11 respectively.

The frame 5 as seen in FIGS. 5, 6 and 8, is in turn rigidly coupled by means of screws 15 to a second frame 16 which supports by means of its bearing 17 the main shaft 18 on the end of which is mounted the cam 19 (FIG. 7) which actuates the arcuate needle 8 and, the plunger 14. Shaft 18, which is parallel to the fell of the cloth, is driven by another shaft located under the breast-beam and driven by the lower shaft of the loom. Both transmissions of movements are effected by means of chains and sprockets (not shown).

On the top of the frame 16 is secured a cradle 20 (FIGS. 5, 6 and 9) by means of screws 21 and which serves as a support for the intermittent-action shaft 22 (FIG. 7) which is mounted in bearings 23 rigidly fixed to the said cradle 20.

The operation of the arcuate needle 8 is effected by means of the rack-bar 6 which slides inside a groove cut into the upper portion of the frame 5, said groove being covered by a plate 24 which is secured to the frame by means of screws 25.

The rack-bar 6 is fitted at one end thereof with a pin 26 on which is mounted a roller 27 (FIGS. 6–8), the said roller being held in contact with the cam 19 under the action of a spring 28 (FIG. 5), one end of the said spring being attached to a stud 29 which is integral with the rack-bar and which moves inside an elongated slot 30 formed in the frame 5 while the other end of the said spring is attached to a stud 31 which is integral with the said frame 5. The cam accordingly imparts a reciprocating movement to the rack-bar.

At the other end of the rack-bar, the teeth 6a of the said rack-bar engage with the toothed sector 32 (FIGS. 11 and 13) which is mounted on the spindle 7 of the arcuate needle, the said spindle being adapted to pivot inside the bearing 9 of the frame 5.

In order to prevent the reaction of the toothed sector 32 on the rack-bar 6, a member 33 as shown in FIGS. 6 and 11 and which is secured to the plate 24 serves as an additional means for guiding the said rack-bar.

Referring to FIGURES 12 and 13, the toothed sector 32 is integral with a U-shaped lever 34, in which is formed a slot 35 permitting of the attachment of an angle-piece 36, the upwardly bent portion of which carries the arcuate needle 8 through the intermediary of a stirrup 37, the arms of which pass into an elongated slot 38 (as shown in FIG. 12) formed in a straight portion 39 which is rigidly coupled to the arcuate needle 8 by means of a member 40.

Not only is it possible by means of this assembly to set the arcuate needle 8 in the desired position but in addition, when it is desired merely to increase or reduce the penetration of the said needle inside the selvedge, it is possible to do so without modifying the end-of-travel position of the needle with respect to the fell $d$ of the cloth. (FIGS. 5 and 6).

For the sake of clarity of the drawings, the arcuate needle itself has been illustrated in FIGS. 5 and 6 in detail. Indicated by means of the arc $e$ in chain-dotted lines, is the path followed by the point of the said needle.

The operation of the plunger 14 is effected by means of a first lever 41 which is integral with the spindle 12 as shown in FIGS. 7 and 8, while the said spindle 12 pivots in the bearing 10, as shown in FIG. 6. The said lever 41 is provided at its extremity with a pin 42 on which is mounted a roller 43 which is held in contact with the cam 19 as a result of the action of a spring 44.

On the other side of the bearing 10, the spindle 12 is integral with another lever 45 which actuates a connecting-rod 46, the said connecting-rod being bent upwards at the end located near the fell of the cloth so as to carry the plunger 14 by means of a clamping nut 47. But in order to produce the most effective movement of the plunger, that is to say, in order to permit the said plunger to withdraw from the shed at the last moment with a minimum displacement while at the same time moving away in front of the reed which beats-up the weft against the fell $d$ of the cloth and while moving clear of the cylinder (not shown in the drawings) of the temple 2, the connecting-rod 46 is pivotally mounted by means of a pin 48 on a lever 49 which pivots about the fixed pin 13 the connecting rod having a pair of bosses for receiving the pin 48. This effective and favorable movement is indicated by the chain-dotted line $f$ (FIG. 5).

The spring 44 which holds the roller 43 in contact with the cam 19 is attached at one end thereof to the rear extremity of the connecting-rod 46 and, at the other end thereof, to the pin 13, as shown in FIG. 5.

The operation of the intermittent-action shaft takes place as follows:

Pinion 50 is keyed to main shaft 18, as seen in FIGS. 6 and 9, and through pinion 51 drives pinion 52 mounted by screw 53 to shaft 22. In order to vary the action of shaft 22 so that it may rotate at one third or one half the speed of main shaft 18, pinion 52 is adapted to be interchangeable between pinions having a diameter twice that of pinion 50 or a diameter three times that of pinion 50. To accommodate this variance in the diameter of pinion 52, pinion 51, mounted on shaft 54, is adapted to be vertically adjustable in slot 55 formed in frame 16.

The intermittent-action cam 56 mounted on shaft 22, (FIGS. 5 to 8) transmits its movement to the intermittent-action disc 57 through a link-rod system comprising a lever 58 which is integral with a spindle 59, the said spindle passing through a bearing 60 of the cradle 20. The end of the said lever 58 carries the pin 61 of the cam roller 62.

On the other side of the bearing 60, the spindle 59 is integral with another lever 63, the extremity of which carries a pin 64 on which is pivotally mounted one of the extremities of a connecting-rod 65, the other extremity of which is attached to an ear 57a of the intermittent-action disc 57.

A spring 66 which is attached to the cradle 20 at 67 and to the lever 63 at 68 holds the roller 62 applied against the intermittent-action cam 56.

The intermittent-action disc 57 pivots about a bearing-bush 69 of the bearing 17. The said bearing-bush takes up the whole width of the bearing 17 of the main shaft 18; a screw 70 which passes through the bearing prevents the bearing-bush 69 from rotating.

The disc 57 is provided at its periphery with two heels 71 and 72 (FIG. 7). When the roller 62 of the intermittent-action cam 56 is on the small radius of the cam, the said heels are located in the position shown in chain-dotted lines at 71' and 72' respectively in FIG. 7, and the rollers 27 and 43 of the arcuate needle and of the plunger respectively move freely from the position shown in full lines to the position 27' and 43' respectively as shown in chain-dotted lines. When the large radius of the intermittent-action cam 56 thrusts back the roller 62, the heels 71 and 72 move into the position shown in full lines in FIG. 7, thereby preventing the rollers 27 and 43 from following the small-radius profile of the cam 19, with the result that the arcuate needle 8 and the plunger 14 remain in the rest position outside the warp threads $a$.

The rollers 27 and 43 have a supplemental length which makes the said rollers project substantially beyond the cam 19 so as to be in the field of action of the heels 71 and 72 (FIGS. 7 and 8). Instead of having such a supplemental length, each of the rollers 27 and 43 can be employed in combination with a second roller which is mounted on the same shaft.

The intermittent-action cam 56 is adjusted so as to ensure that the intermittent-action disc 57 either comes into contact with or ceases to come into contact with the rollers 27 and 43 when these latter are both on the large-radius profile of the cam 19.

The operation of the device will readily be understood with reference to the following:

If it is desired, for example, to form the selvedge which is illustrated in FIG. 1, which entails the insertion of a loop of separate thread after every third pick, the intermittent-action control of FIG. 9 is employed with the ratio of 1/3, and the cam 56 is that illustrated in FIG. 7.

In order to form the selvedge which is illustrated in FIG. 2 and which entails the insertion of two loops after every third pick, the intermittent-action control of FIG. 9 remains established for the ratio of 1/3, but the cam 56 of FIG. 7 has a different profile inasmuch as the portion having a large radius extends over a smaller arc so that the insertion of the separate thread is prevented from taking place only in one shed out of three.

It will be understood that if it is desired to insert one loop in each shed, it is merely necessary to render inoperative the intermittent-action movement, for example by removing the pinion 51.

During deweaving operations, it can be useful to prevent the operation of the arcuate needle and the plunger. Locking means are provided for this purpose, such as a ratchet system or the like which are actuated as soon as a break or shortage of weft is detected and which produce action on the disc 57 (or on the link-rod system which transmits the movement of the cam 56 to the said disc) in such manner as to immobilize the heels 71 and 72 of the disc 57 as soon as these latter come into position beneath the rollers 27 and 43, that is, if they are not already in this position.

Instead of the cam 19, it would be possible to employ a grooved cylinder cam which is keyed so as to slide on the main shaft 18, the said grooved cylinder cam being displaced axially by means of a fork actuated by the intermittent-action cam 56 during the period of rest of the two rollers 27 and 43; consequently the said grooved cylinder cam, when moving away from the said rollers, would lose control of these latter and resume control when moved back by the fork in the direction of these same rollers.

The intermittent-action cam 56 could actuate the intermittent-action disc 57 directly, that is to say without the intermediary of the link-rod system 58–59–63–64–65;
to this end, the cam 56 would be placed in the same plane as the disc 57, this latter comprising an extended portion fitted with a roller which comes into contact with the cam 56. The profile of the cam 56 would obviously be designed so as to impart to the disc 57 a movement of sufficient amplitude.

In the embodiment which is illustrated in FIGS. 14 to 19, and in which FIGS. 11, 12 and 13 are also valid, the frame 5 is rigidly coupled by means of the screws 15 to a second frame 73 (FIGS. 14, 15 and 17) which supports the main shaft 76 by means of its bearings 74 and 75 and which supports the countershaft or secondary shaft 79 by means of its bearings 77 and 78; at the end of the main shaft 76 is mounted the cam 19 (FIGS. 15 and 16) which actuates the arcuate needle 8 and, the plunger 14.

On the main shaft 76 is mounted a pinion with two steps 80 and 81 which is adapted to slide longitudinally along the said shaft and on a key 82 so as to be placed in one of the three positions defined hereunder, in which the said pinion is stopped as a result of the tightening of the screw 83 in one of the three holes 84–85–86.

The countershaft or secondary shaft 79 carries two gears, one of which has two steps 87 and 88 and drives the said shaft in rotation as a result of the tightening of screws such as the screw 89 (with interposition between the shaft and the screw of a clamping pastille 89a), while the other gear 90, which is driven by the shaft by means of a locking-pin 91, meshes with a gear 92 which drives the intermittent-action disc 93 (FIGS. 18 and 19) through the intermediary of a key 94 which is embedded in the hub 95 of the said disc. A locking screw 96 maintains the longitudinal position of the gear 92. The gear 92 is provided with a number of teeth which is double the number of teeth of the gear 90, with the result that the intermitent-action disc 93 rotates at one-half the speed of the countershaft 79.

When the main shaft gear is placed in the position which is defined as a result of the tightening of the screw 83 inside the hole 84, the step 80 of the said main shaft gear meshes with the step 87 which has the same number of teeth, and the countershaft 79 rotates at the same speed as the main shaft 76; the intermittent-action disc 93 consequenly rotates at one-half the speed of the main shaft 76.

When the main shaft gear is placed in the position which is defined as a result of the tightening of the screw 83 inside the hole 86, the step 81 meshes with the step 88, thereby producing, by reason of the fact that the step 81 has a number of teeth equal to 2/3 that of the step 88, a reduction of 3 to 2 between the shaft 76 and the shaft 79; the intermittent-action disc 93 consequently has an angular speed which is equal to one-third that of the main shaft 76.

The value of the arc of the flange 93a of the intermittent-action disc 93 is pre-determined in such manner that, in one or the other of the two insertion frequencies (1 in 2 or 1 in 3), and under suitable conditions of angular setting of the disc 93 with respect to the cam 19, the beginning and end of the non-insertion period, that is to say the passing of the beginning and of the end of the flange 93a of the disc 93 vertically above the roller of the arcuate needle 95, accordingly take place when the roller 95 of the arcuate needle is on the large radius of the cam 19, thereby producing the result that the action of the intermittent-action disc takes place without any shock occurring.

Other frequencies of insertion can be obtained by adopting gears 80, 81, 87, 88, 90, 92 so designed that the ratios of angular speeds of the cam 19 and of the disc 93 correspond to such frequencies, and also by adopting a flange 93a which covers a rotation time also corresponding to these frequencies; in the case of certain insertion frequencies, it can be necessary to provide the intermittent-action disc with a detachable flange which is fixed in the working position by means of screws in such manner as to cover with the same apparatus and with the maximum number of common parts, frequencies which would not make it feasible to employ a flange having one and the same length of arc.

In the central position of the gear having two steps 80, 81, this position being defined as a result of the tightening of the screw 83 inside the hole 85, there is no driving of the countershaft 79 by the main shaft 76 and consequently no driving of the intermittent-action disc 93. By immobilizing the intermittent-action disc 93, for example by securing the shaft 79 to the frame 73 so that the interrupted portion of the flange 93a is located in the zone of reciprocating motion of the roller 93 of the arcuate needle, the insertion of one loop of separate thread is accordingly effected in each shed of the weave. If, on the contrary, the flange 93a is immobilized in the zone of reciprocating motion of the roller 95 of the arcuate needle, the non-insertion becomes permanent and there no longer takes place any insertion of separate thread.

Figure 18:
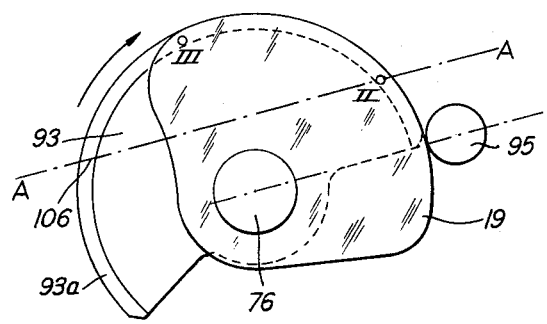
FIG. 18 shows in side elevation the setting position of the intermittent-action disc with respect to the cam for he purpose of effecting the insertion of a single loop of separate thread at each alternate revolution of the loom.

FIG. 18 serves to explain the manner in which the setting is effected for the purpose of inserting one loop of the separate thread c at every alternate revolution of the loom.

After first slackening-off the screw 89 and thus loosening the two-step gear 87–88 on the countershaft 79, the weaving loom is rotated by hand so as to bring a reference point II marked on the cam 19 into the plane AA of the top face of the cover-plate 24 of the rack-bar 6, and on the right hand side of the figure. The screw 83 of the two-step gear 80–81 is then slackened-off, the gear 80 is made to engage with the gear 87 and the screw 83 is then tightened inside the hole 84. The reference mark 106 carried by the disc 93 is brought into the plane AA, and on the left hand side of the figure, by manually rotating the assembly 79–90–92–93, following which the screw 89 is tightened hard up.

Figure 19:
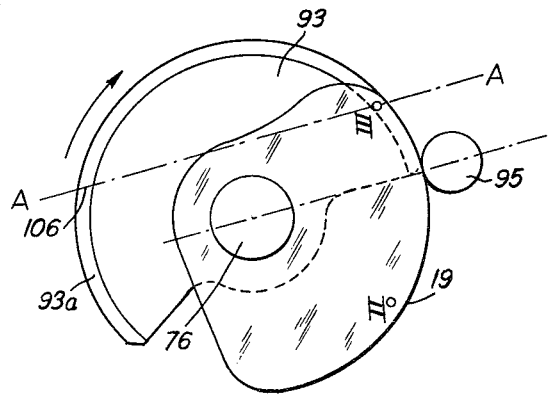
FIG. 19 is a similar view to FIGURE 18 showing the disc which is set for the purpose of inserting a single loop at every third revolution of the loom.

FIG. 19 corresponds to the setting for the purpose of inserting a loop of separate thread at every third revolution of the loom. The mode of operation is similar to that which has been described in the foregoing; it does differ in this respect, however, that on the one hand it is the meshing of the gears 81–88 which is effected and, on the other hand, it is the other reference mark III of the cam 19 which is brought into the plane AA.

During deweaving operations, the locking means are combined so as to produce action directly on the rack-bar 6 and, if so required, on the elements which transmit the drive to the plunger.

Figure 20:
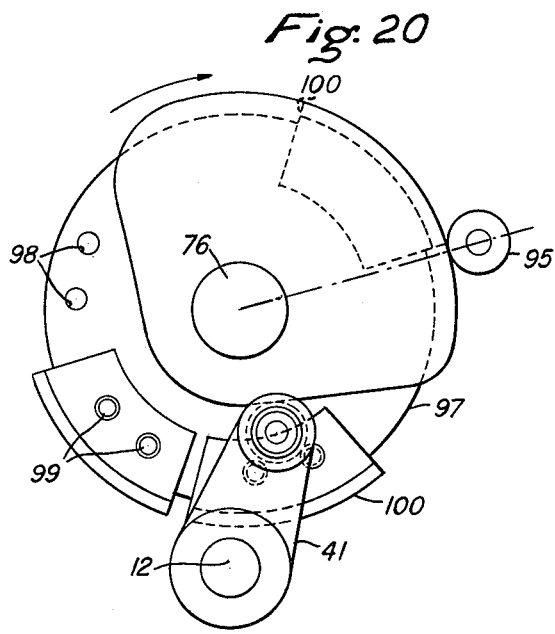
FIG. 20 is a view similar to FIG. 16 showing an alternative form of execution of the second form of embodiment of the invention.
Figure 21:
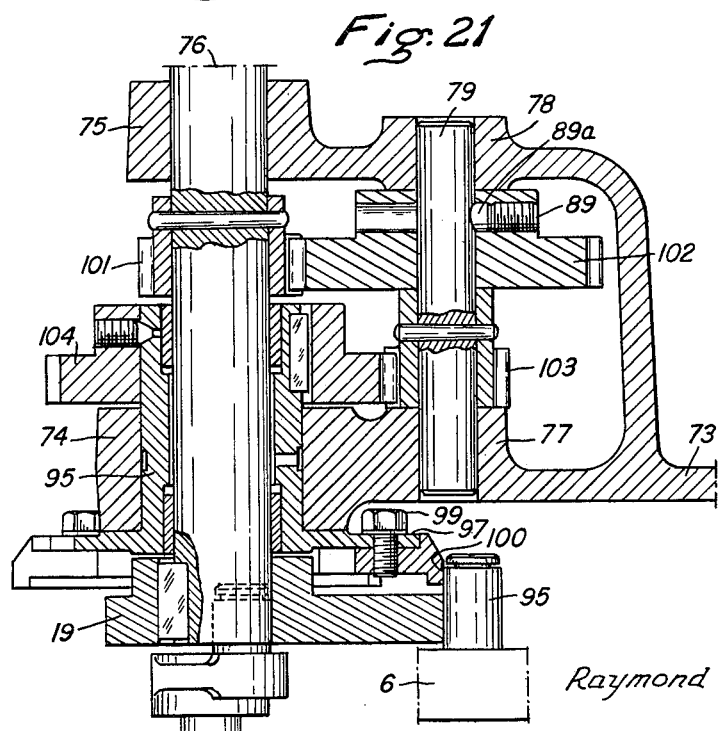
FIG. 21 is a view similar to FIG. 17 relative to this same alternative form.

In accordance with another form of the invention which is shown in FIGS. 20 and 21, the intermittent-action disc is constituted by a complete circle 97 which is pierced with threaded holes 98 in proximity to the periphery thereof; the said holes serve to attach by means of screws 99 removable flanges 100 which are placed according to the desired frequency of insertion of loops.

In the example illustrated in the drawings, the train of pinions 101, 102, 103, 104, (as shown in FIG. 21) imparts to the intermittent-action disc 97 an angular speed equal to one-sixth of that of the main shaft 76. The pinion 102 can be adjusted angularly on the shaft 79 by the means 89–89a which have already been described. Each removable flange 100 covers the periphery over an angle of approximately 60°.

By means of this arrangement, it is possible to obtain a range of frequencies starting from a single insertion of a loop at every sixth revolution of the loom.

The arrangement of the three flanges 100 of FIG. 20 will produce two consecutive insertions of loops followed by two non-insertions, then one insertion of a loop followed by one non-insertion.

It is understood that alternative forms, detail improvements and uses of equivalent means can subsequently be devised without thereby departing either from the scope or the spirit of the present invention.

I claim:
1. In a loom, warp threads having sheds formed therein to receive weft threads, said weft threads being beaten-up into a fell to form a fabric, a device for forming selvedges along marginal warp threads; said device including a needle for inserting an auxiliary thread between the marginal warp threads of the shed, a plunger operable to temporarily engage and retain the auxiliary thread, whereby a loop is formed in said auxiliary thread as the needle leaves the shed, the loop being beaten-up against the fell together with a corresponding weft thread, means operatively connected with said needle for actuating said needle in a predetermined motion while the shed is open and operatively connected with said plunger for actuating said plunger in a predetermined motion and in conjunction with the motion of said needle, said means comprising a cam, a main rotary shaft mounting said cam, rollers engageable with said cam and operatively connected to said needle and to said plunger, and resilient means for urging said rollers into engagement with said cam, disc coaxial with said cam and having arcuate portions adapted to retain at least the roller operatively connected to said needle at a distance equal to the outer limit of the cam for preventing said needle from moving to active position, and means for driving said disc from said main shaft, whereby the first-mentioned means are rendered inoperative during a predetermined number of shed changes.

2. A selvedge forming device in accordance with claim 1, wherein the means for driving said disc comprises an intermittent action shaft, and cooperating gear means on both said main and said intermittent action shafts to provide that said intermittent action shaft is rotatively driven from said main shaft.

3. A selvedge forming device in accordance with claim 2, wherein said gear means comprise gears of variable ratio.

4. A selvedge forming device in accordance with claim 2, wherein said disc is mounted for free rotation on said main shaft and is operatively connected to said intermittent action shaft by gear means ensuring continuous rotation of said disc in a single direction.

5. A selvedge forming device in accordance with claim 2, wherein the gears mounted on one of said shafts are disconnectible therefrom.

6. A selvedge forming device in accordance with claim 2, wherein the ratio of said gear means is such that the rotational speed of said intermittent action shaft is a fraction of the rotational speed of said main shaft, and wherein arcuate portions of said disc are removably mounted on the circular periphery of said disc so as to provide for any selected timing of rendering inoperative the means for actuating said needle number of shed changes.

7. A device according to claim 1, wherein said disc is mounted coaxially with and near the main shaft cam.

8. A device according to claim 7, wherein said disc has the shape of a sector so arranged and of such dimensions that said cam roller, which furthermore is long enough to permit of its engagement by said sector, is periodically prevented from following the movement of said main shaft cam as a result of the action of said sector.

9. A device according to claim 1, wherein said disc is constituted by a circular member fitted with at least one detachable flange so disposed as to produce the frequency selected for the insertion of said auxiliary thread loops.

10. In a loom, warp threads having sheds formed therein to receive weft threads, said weft threads being beaten-up into a fell to form a fabric, a device for forming selvedges along marginal warp threads; said device including a needle for inserting an auxiliary thread between the marginal warp threads of the shed, and a plunger operable to temporarily engage and retain the auxiliary thread whereby a loop is formed in said auxiliary thread as the needle leaves the shed, the loop being beaten-up against the fell of the fabric together with a corresponding weft thread, a main rotary shaft, a cam mounted on said main shaft, rollers engageable with said cam and operatively connected to said needle and to said plunger, resilient means for urging said rollers into engagement with said cam, a disc coaxial with said cam and having arcuate portions adapted to retain at least the roller operatively connected with said needle at a distance equal to the outer limit of the cam for preventing said needle from moving to an active position, an intermediate shaft, cooperating gear means carried on both said main and said intermediate shafts for driving said intermediate shaft from said main shaft, another cam mounted on said intermediate shaft, a cam roller cooperating with said other cam, and a leverage for operatively connecting said cam roller to said disc for ensuring periodical oscillating movement of said disc, the ratio of said gear means being such that the rotational speed of said intermediate shaft is a fraction of the rotational speed of said main shaft.

11. In a loom, warp threads having sheds formed therein to receive weft threads, said weft threads being beaten-up into a fell to form a fabric, a device for forming selvedges along marginal warp threads; said device including a needle for inserting an auxiliary thread between the marginal warp threads of the shed, and a plunger operable to temporarily engage and retain the auxiliary threads whereby a loop is formed in said auxiliary thread as the needle leaves the shed, the loop being beaten-up against the fell of the fabric together with a corresponding weft thread, a rod supporting said plunger, a pair of arms pivoted respectively on two fixed axes, said rod being connected to the free ends of said arms, a pivoting pin connected to one of said arms, means operatively connected with said needle for actuating said needle in a predetermined motion while the shed is open and for pivoting said pin whereby said plunger is actuated in a predetermined motion and in conjunction with the motion of said needle, said means comprising a cam, first connecting means operatively connected to said cam and said needle and second connecting means operatively connected to said cam and said pivoting pins, and means for rendering at least the first connecting means inoperative during an adjustable predetermined number of shed changes.

References Cited by the Examiner

UNITED STATES PATENTS

| 1,081,384 | 12/13 | Jackson | 139—80 |
| 1,541,959 | 6/25 | Howarth | 139—80 |
| 1,724,283 | 8/29 | Howard | 139—80 |
| 2,923,324 | 2/60 | Johnson | 139—80 |

FOREIGN PATENTS

| 594,472 | 6/25 | France. |
| 1,191,793 | 10/59 | France. |
| 1,227,592 | 3/60 | France. |

MERVIN STEIN, *Primary Examiner.*

RUSSELL C. MADER, DONALD W. PARKER,
*Examiners.*